US005820714A

United States Patent [19]

Lerner

[11] Patent Number: 5,820,714

[45] Date of Patent: Oct. 13, 1998

[54] METHOD AND APPARATUS FOR REGISTERING BOTTLES

[75] Inventor: Hershey Lerner, Aurora, Ohio

[73] Assignee: Illinois Tool Works, Inc., Glenview, Ill.

[21] Appl. No.: 659,561

[22] Filed: Jun. 6, 1996

Related U.S. Application Data

[63] Continuation of Ser. No. 247,649, May 23, 1994, abandoned.

[51] Int. Cl.[6] .......... B32B 31/00

[52] U.S. Cl. .......... 156/64; 156/294; 156/366; 156/556; 156/566; 198/462.1; 198/462.3

[58] Field of Search .......... 156/64, 86, 294, 156/366, 556, 558, 566; 198/462.1, 462.3

[56] References Cited

U.S. PATENT DOCUMENTS

| | | | |
|---|---|---|---|
| 1,594,165 | 8/1926 | Miller . | |
| 1,981,641 | 11/1934 | Benoit | 198/462.1 |
| 2,319,908 | 5/1943 | Walter . | |
| 2,579,631 | 12/1951 | Von Hofe et al. . | |
| 2,681,758 | 6/1954 | Lipson . | |
| 2,751,735 | 6/1956 | Bartlett et al. . | |
| 2,846,835 | 8/1958 | Aguilar et al. . | |
| 3,355,856 | 12/1967 | Randrup . | |
| 3,551,258 | 12/1970 | Galvanoni | 156/556 |
| 3,924,387 | 12/1975 | Konstantin . | |
| 4,102,728 | 7/1978 | Smith . | |
| 4,243,466 | 1/1981 | Lindee . | |
| 4,283,245 | 8/1981 | Benoit | 156/556 X |
| 4,412,876 | 11/1983 | Lerner et al. . | |
| 4,638,756 | 1/1987 | Collmann . | |
| 4,881,882 | 11/1989 | Fantacci . | |
| 4,931,131 | 6/1990 | Thompson | 156/556 |
| 4,944,825 | 7/1990 | Gifford et al. . | |
| 5,197,586 | 3/1993 | Marti Sala | 198/462.3 |
| 5,232,541 | 8/1993 | Gifford . | |

*Primary Examiner*—David A. Simmons
*Assistant Examiner*—Paul M. Rivard
*Attorney, Agent, or Firm*—Watts, Hoffmann, Fisher & Heinke Co., L.P.A.

[57] ABSTRACT

An apparatus and method are shown and described for labeling bottles in a stream. An input conveyor is provided for supplying bottles to a presenting station. Bottles are restrained at the presenting station until the appropriate time by an entrance gate. Bottles are conveyed from the presenting station to a work station by an advancing conveyor. Bottles entering the work station drive the predecessor bottle out of the work station to a slowing conveyor. Slowed bottles are abutted by subsequent relatively faster moving bottles to be labeled. Abutment with a slowed labeled bottle serves to register each bottle to be labeled at the labeling station.

5 Claims, 6 Drawing Sheets

METHOD AND APPARATUS FOR REGISTERING BOTTLES

This is a continuation of application No. 08/247,649, filed on May 23, 1994

BACKGROUND OF THE INVENTION

1. Field of the Invention

The invention relates generally to apparatuses and methods for labeling products, and more particularly, to apparatuses and methods for applying flexible, tubular labels to containers.

Reference to Related Patents and Applications.

U.S. Pat. No. 4,944,825 issued to Eric Gifford et al. on Jul. 31, 1990 entitled "Labeling Apparatus" (Here the Filled Bottle patent).

U.S. Pat. No. 5,232,541 issued to Eric Gifford on Aug. 3, 1993 entitled "Apparatus for Registering Bottles" (Here the New Filled Bottle patent).

U.S. Pat. No. 4,620,888 issued to William Easter et al. on Nov. 4, 1986 entitled "Labeling Apparatus" (Here the ASA 90 patent).

U.S. Pat. No. 4,565,592 issued to Rich Wehrmann et al. on Jan. 21, 1986 entitled "Automated Manufacturing Monitoring " (Here the Label Positioning patent).

U.S. Pat No. 4,412,876 issued to Bernard Lerner et al. on Nov. 1, 1983 entitled "Labeling Apparatus" (Here the ASA 60 patent).

Ser. No. 08/129,657 filed by Dana Liebhart on Sep. 30, 1993 entitled "Method and Apparatus for Rounding Objects" now U.S. Pat. No. 5441,678 issued Aug. 15, 1995 (Here the DeDenter).

These 5 patents and the application are each hereby incorporated in their entireties by reference.

2. Background Information

Tubular, flexible, labels have become popular for labeling plastic vessels such as "two-liter" bottles. Labeling filled bottles presents special problems for labeling machines due to the added mass of the fluid and the effect of the fluid mass moving within the bottle. An apparatus and method for labeling filled bottles which is disclosed in the Filled Bottle Labeler patent has enjoyed considerable success. However, this apparatus requires costly specialized parts, does not adapt well to variations in bottle shapes and will occasionally jam and damage bottles. Fluid-filled bottles create greater problems when damaged in a labeling operation because the contents spill over the machinery and other bottles. Therefore, a need has arisen for a filled bottle labeler which can be manufactured at low cost, which accepts variations in the shapes of bottles to be labeled, and which reduces jams and down time.

The present assignee has developed an improved machine for labeling filled bottles, which is disclosed in the New Filled Bottle patent. This machine halts the bottle to be registered for labeling and the downstream labeled bottle. While this machine has been successful, it brings downstream bottles to a complete stop, which is undesirable in high speed bottling operations.

SUMMARY OF THE INVENTION

A new labeling apparatus is provided which is insensitive to bottle shape variations and is highly reliable. The labeling apparatus of the present invention includes a label applying assembly and a product advancing assembly. The product advancing assembly includes an advancing conveyor for advancing an unlabeled product from a product presenting position to a label applying position. A slowing conveyor is located a predetermined distance downstream from the label applying position for slowing the motion of a labeled product downstream of the unlabeled product. The unlabeled product abuts and is registered with respect to the label applying position by abutting against a slowed downstream labeled product. The slowing conveyor operates to carry the labeled products downstream to isolate the product to be labeled.

In the preferred and illustrated embodiment, the labeling apparatus further includes an entrance gate for preventing products in the presenting station from approaching the labeling position until the appropriate time.

A new method is also provided for applying labels to products.

The method includes advancing a product to be labeled to a product presenting position using a conveyor. A product is engaged at the presenting position with an advancing conveyor and driven toward a labeling station. The driven product pushes a predecessor product out of the labeling station and into a slowing conveyor. The driven product is then registered by abutting against a slowed downstream product. The slowed downstream product is conveyed further downstream, As a label is applied to the registered product.

DESCRIPTION OF THE PREFERRED EMBODIMENT

Figure 1:
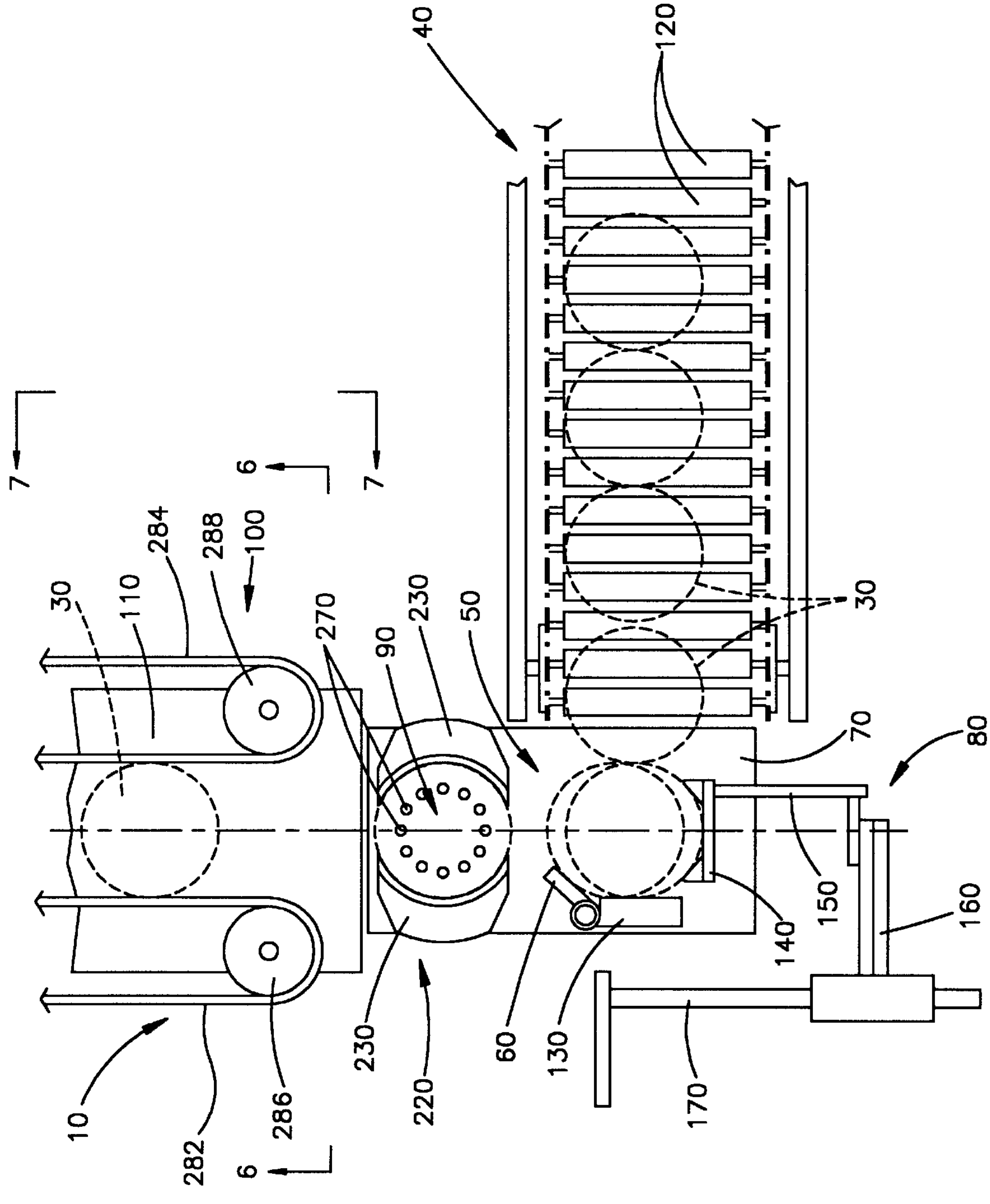
FIG. 1 is a schematic plan view showing a labeling apparatus in accordance with the present invention.

Referring to FIGS. 1–5, a labeling apparatus 10 is shown for applying sleeve labels 20 to individual bottles 30. With reference to FIG. 1, the apparatus includes an input conveyor 40, a presenting station 50, an entrance gate 60, a slide plate 70, an advancing conveyor 80, a work station 90, a slowing conveyor 100, and an exit support 110. The labeling apparatus 10 isolates and registers individual bottles 30 in a stream of bottles. The bottles 30 are isolated and registered at the work station 90 where a labeling applying tool 220 applies a label 20 to each bottle 30.

The stream of bottles is brought to the presenting station 50 by the input conveyor 40. The preferred input conveyor 40 is a continuously running roller chain conveyor of the type disclosed in FIGS. 10 and 11 of the Filled Bottle. The bottles 30 on the input conveyor 40 are continuously urged in the downstream direction toward the presenting station 50. If a bottle occupies the presenting station 50, as illustrated in FIG. 1, each bottle 30 on the input conveyor 40 is obstructed from moving forward by its neighboring downstream bottle. The bottles 30 on the input conveyor 40 may remain stationary while the input conveyor 40 continues to move beneath them by virtue of free-wheeling rollers 120. With this arrangement, bottles are continuously urged toward the presenting station 50 and a bottle 30 will only be pushed into the presenting station 50 when it is unoccupied.

Figure 2:
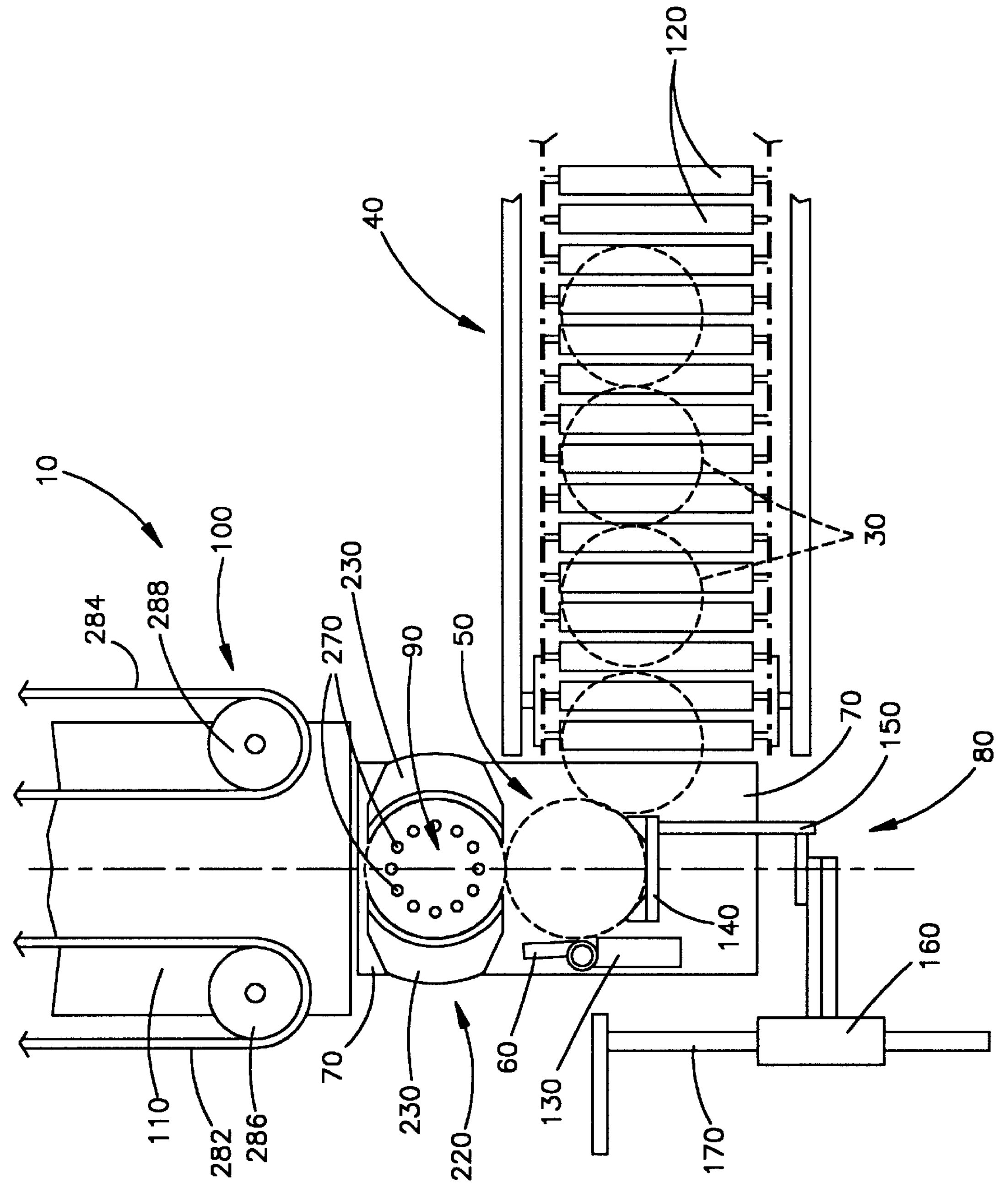
FIG. 2 is the view of FIG. 1 at a later time in the labeling cycle.
Figure 3:
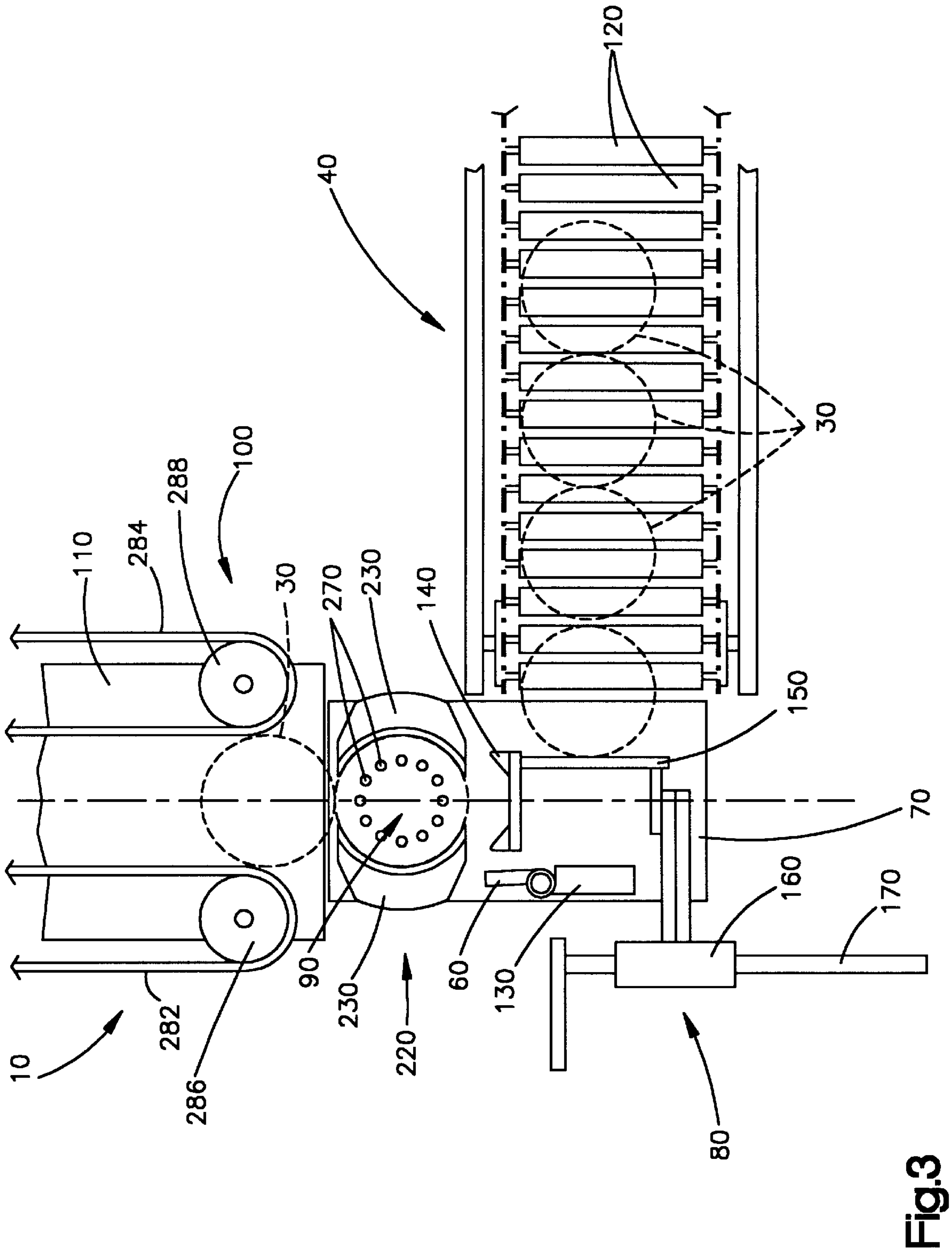
FIG. 3 is the view of FIG. 1 at a still later time in the labeling cycle.

Underlying the presenting station 50 is the slide plate 70, which is simply a smooth flat plate. Bottles 30 leaving the input conveyor 40 are pushed onto the slide plate 70 until the lead bottle abuts a stop 130. The slide plate 70 extends in the downstream direction from the presenting station 50 to the exit conveyor 110 as illustrated in FIGS. 1–3.

Figure 4:
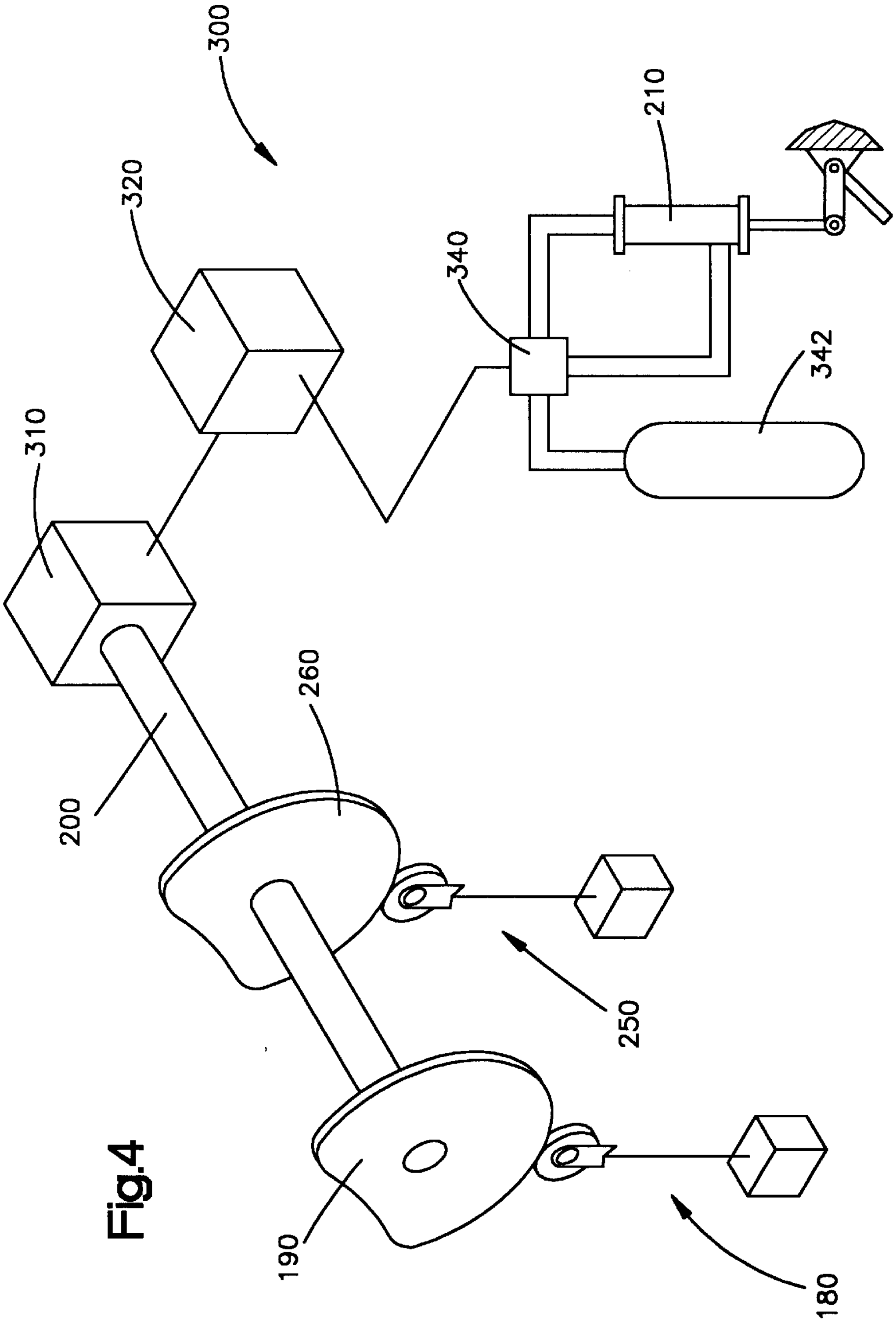
FIG. 4 is a schematic view of the timing apparatus of the labeling apparatus.

The advancing conveyor 80 is proximate the presenting station 50 and includes a pusher 140, a barrier arm 150, and a slider arm 160. The pusher 140 engages individual bottles 30 to push them along the slide plate 70 toward the work station 90 and then returns. The movement of the pusher 140 is repeated in continuous cyclic fashion. The barrier arm 150 blocks the downstream bottle on the input conveyor 60 from entering the presenting station 50 until the pusher 140 has fully returned as illustrated in FIG. 3. The slider arm 160 slides on a pair of parallel guide bars 170 for guiding the advancing conveyor's reciprocating motion. A pusher cam follower mechanism 180 is connected to the slider arm 160 for driving the slider arm 160 in a predetermined synchronized motion. Preferably, the pusher cam follower mechanism 180 is driven by a pusher cam 190 connected to a main drive shaft 200 as illustrated in FIG. 4.

The entrance gate 60 is located adjacent the pusher 140 to block or unblock the path of the bottles. The entrance gate 60 is preferably opened and closed by the operation of a pneumatic cylinder 210 connected thereto as illustrated in FIG. 4. The entrance gate 60 is timed to open as the pusher 140 begins driving a bottle 30 towards the work station 90. The bottle entrance gate 60 serves to restrain the bottle 30 in the presenting station 50, which is under constant force by the neighboring upstream bottle on the input conveyor 40. The bottle 30 at the presenting station 50 tends to be jostled in the downstream direction by incoming bottles on the input conveyor 40 if not restrained by the entrance gate 60.

Figure 5:
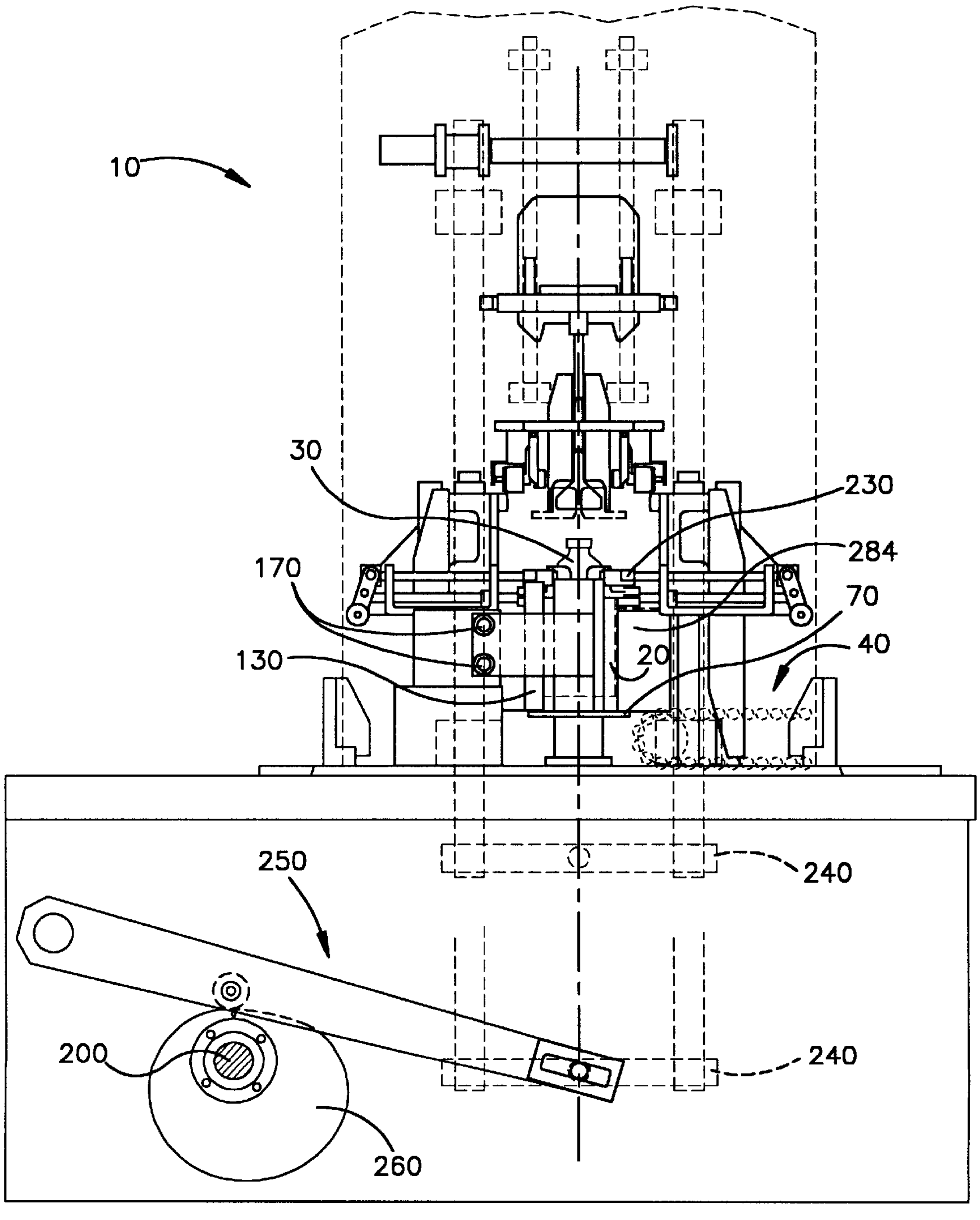
FIG. 5 is a front elevational view of the labeling apparatus with portions cut away.
Figure 6:
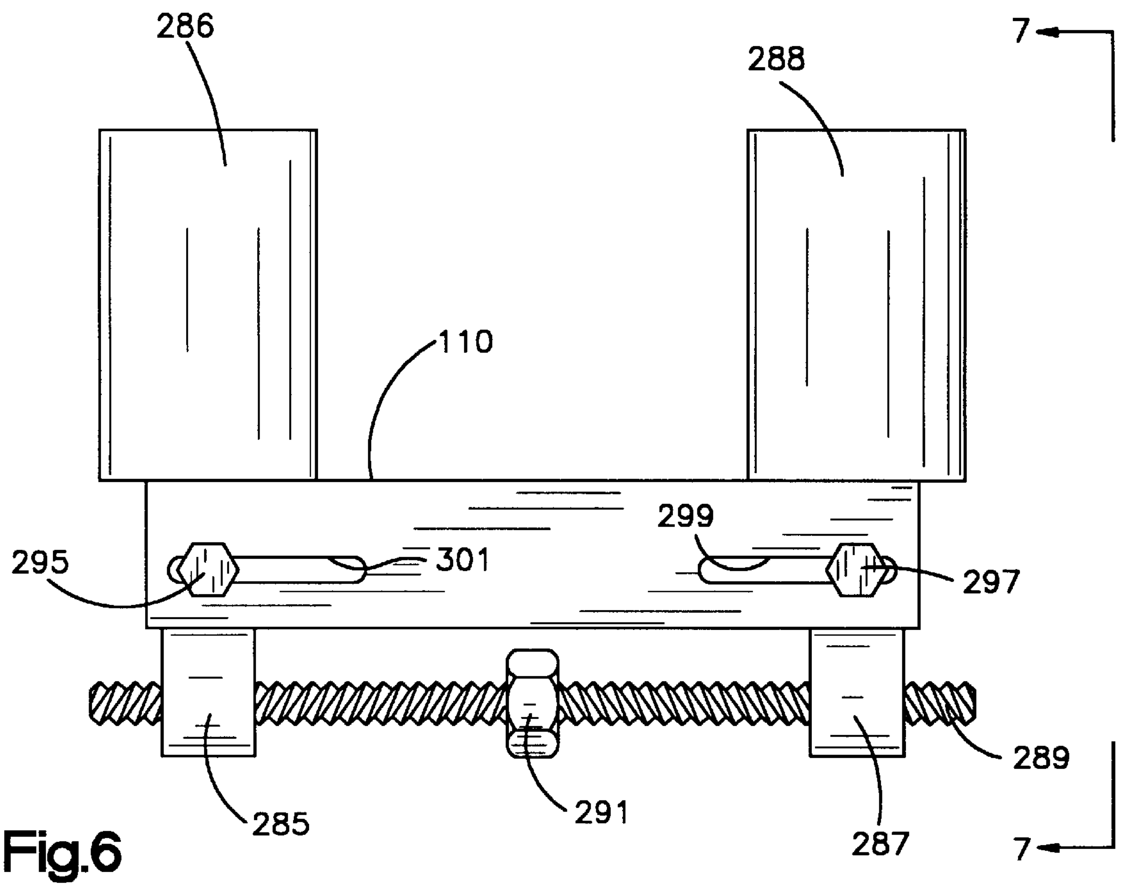
FIG. 6 is a schematic elevational view as seen approximately from a plane indicated by the line 6—6 in FIG. 1.

Downstream of the presenting station 50 is the work station 90. The work station 90 includes a labeling tool 220 for continuously and cyclically applying sleeve labels 20 to individual bottles 30. The labeling tool 220 is essentially the same as that disclosed in the Filled Bottle patent which has been incorporated by reference. Further details of the labeling tool are disclosed in the ASA 60, Label Positioning and ASA 90 patents. An opposed pair of label appliers 230 are reciprocatable vertically on a carriage 240 (FIG. 6). During a portion of their cycle, the label appliers 230 are clear of the bottle 30 in the work station 90 so bottles may be moved into and out of the work station 90 without interference. The label appliers 230 are synchronized to move in a predetermined relationship to the pusher 140, and the entrance gate 60. Preferably, the label appliers 230 are driven by a labeling cam follower mechanism 250 which is in turn driven by a labeling cam 260 connected to the main drive shaft 200 as illustrated in FIGS. 4 and 5.

The work station 90 includes a vacuum stabilizer. Vacuum ports 270 are formed in the slider plate 160 such that the bottom of each bottle 30 being labeled substantially covers the ports 270. Vacuum is communicated with the ports 270 to hold the bottles 30 in position. This feature prevents bottles 30 from rocking while allowing a limited amount of lateral sliding even if fluid within the bottles is splashing around thus assuming proper bottle registration at the labeling station.

The slowing conveyor 100 is located downstream from the labeling station and above the bottle exit support 110. The disclosed slowing conveyor 100 comprises two opposed conveyor belts 282 and 284, which are positioned on opposite sides of the bottle path to form a conveyor nip. A pair of pulleys 286, 288 are shown supporting the upstream ends of the belts 282, 284. The axes of the pulleys are normal to the plane of the exit support 110. The belts 282, 284 are adjustably positioned a predetermined distance apart for a given bottle size such that the bottles will be gripped with an appropriate amount of friction. The belts 282, 284 extend at least as high as the center of gravity location of the bottles in the stream. The belts 282,284 are driven by a motor (not shown) to operate at a speed which is relatively slower than the speed of the pusher conveyor 140. Bottles which just received labels are driven from the work station to the slowing conveyor 100 by a subsequent bottle to be labeled. The just labeled bottles are engaged on opposite sides by the belts 282,284 and are slowed but not stopped as they move downstream. The slowing conveyor 100 is located at a predetermined distance downstream from the work station 90 for a given bottle size.

FIG. 6 shows schematically a device for adjusting the distance between the pulleys 286, 288 so that the conveyor 100 may accommodate bottles of different diameters. The adjusting device includes a pair of pulley supports 285, 287 and a threaded shaft 289. The shaft 289 includes a hexagonal turning head 291. The threads on one side of the turning head 291 are opposite handed from those on the other side like a turn buckle. Each pulley support 285, 287, has a threaded opening for receiving the shaft 289. Rotation of the head 291 causes the pulleys 286, 288 either to move closer together or further apart depending on the direction of rotation. Other pulleys (not shown) on the conveyor 100 are similarly adjusted. Slots 293, FIG. 7, may be formed in the support plate 110 to allow for the movement of the pulley supports 285, 287.

Figure 7:
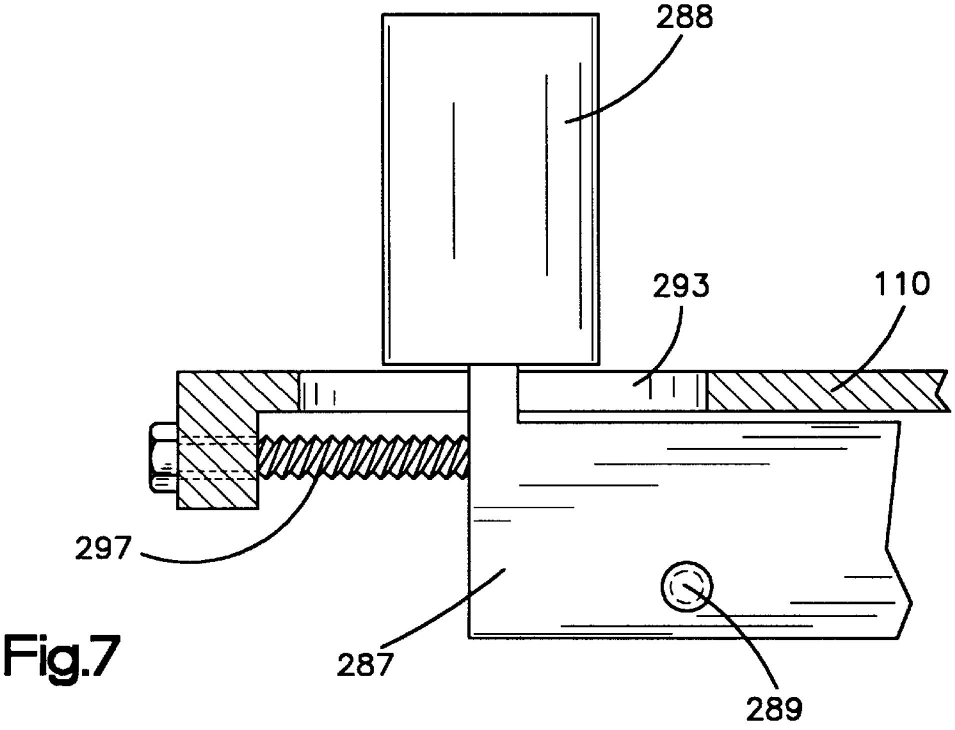
FIG. 7 is a schematic side elevational view as seen approximately from a plane indicated by the line 7—7 in FIG. 1.

FIG. 7 shows schematically a device for adjusting the distance between the work station 90 and the pulleys 286, 288. The device includes a pair of bolts 295, 297 which are threaded to the pulley supports 285, 287. Rotation of the bolts 295, 297 causes the pulleys 286, 288 to move further from or closer to the work station 90 depending on the direction of rotation. A pair of slots 299, 301 permit lateral movement of the bolts. Numerous other mechanisms for adjusting the positions of the pulleys are readily available to one of ordinary mechanical skill.

As an alternate to the disclosed two belt system, a fixed flat vertical element and an opposed conveyor as taught and claimed in the DeDenter Application may be employed as the slowing conveyor. This alternate slowing conveyor serves the multiple functions of 1) arresting the motion of a just labeled bottle to locate a succeeding bottle in the work station, 2) transport to a downstream conveyor and 3) at least partial rerounding of the labeled bottles that may have become dented during earlier processing.

A timing apparatus 300 is provided for synchronizing the pusher conveyor 140, the entrance gate 60, and the labeling tooling 230. As illustrated in FIG. 4, the main drive shaft 200 drives the pusher and labeling cams 190, 260. The pusher cam 190 is connected to the pusher cam follower mechanism 180 for operating the advancing conveyor 80. Reciprocating motion from the pusher cam follower mechanism 180 is transferred to the slider arm 160 in a manner well understood by those with ordinary mechanical skill. The labeling cam 260 is connected to the labeling cam follower mechanism 250 for driving the label appliers 230 cyclically up and down.

The timing apparatus 300 further includes an encoder device 310 for producing digital signals corresponding to discrete rotational positions of the main drive shaft 200. For example, an encoder sold under the name BEI model H25D-CCW-8CG-7406-EM20-S may be used. The signals from the encoder device 310 are sent to a microprocessor 320 which is programmed to send operating signals to the entrance-gate valve 340, which controls the operation of the entrance gate pneumatic cylinder 210. The valve 340 is operable to connect or disconnect opposite ends of the pneumatic cylinder 210 with a pressurized air supply 342. Thus, at the appropriate times in the labeling cycle, as determined by the rotational position of the main drive shaft 200, the entrance gate 60 is either opened or closed with air pressure. The pusher 140 pushes a bottle to be labeled toward the work station 90 only when the entrance gate 60 is open. The predecessor (labeled) bottle is driven out of the work station 90 at a relatively fast speed and into the slowing conveyor 100 where it is slowed but not stopped. The bottle to be labeled, which is moving relatively fast, then abuts the slowed predecessor bottle and is caused to stop. The relative speeds of the pusher 140 and the slowing conveyor 100 are adjusted such that the bottle to be labeled is properly registered at the work station by its impact with the predecessor bottle. The slowing conveyor 100 carries the slowed bottle downstream thus isolating the bottle being labeled. Since the bottle being labeled is isolated from the stream, there is ample clearance around it for operation of the label appliers 230.

Operation

To be labeled bottles 30 are advanced to the presenting station 50 using the input conveyor 40. The bottles 30 are then sequentially engaged by the pusher 140 and driven toward the work station 90. A downstream labeled bottle 30, in the work station is pushed out of the work station 90 by the bottle to be labeled being driven by the pusher 140. The labeled bottle is pushed into position to be gripped and slowed by the slowing conveyor 100 to serve as a registration abutment to locate the bottle to be labeled in the work station. The just labeled bottle is conveyed downstream by the slowing conveyor to isolate the bottle now registered in the work station 90 as a label 20 is applied to the registered bottle. The process is then repeated.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A method for labeling tubular product containers with tubular sleeves, comprising the steps of:

(a) advancing a container to be labeled to a product presenting position;

(b) engaging said container at the presenting position with an advancing mechanism and driving said engaged container toward a labeling station;

(c) pushing a predecessor container out of said labeling station with said driven container;

(d) slowing said predecessor container with a slowing conveyor;

(e) registering and stabilizing said driven container at said labeling station by abutting it against said slowed downstream container while concurrently conveying said predecessor container further downstream; and (f) as the predecessor conveyor is conveyed yet further downstream concurrently maintaining the registered container in the label application position; and applying one of said tubular sleeves to said registered container.

2. A bottle labeling machine including a bottle registration system for registering individual bottles in a stream of bottles, said machine comprising:

an entry conveyor defining a portion of a flow path;

a slide plate adjacent to said entry conveyor for receiving bottles delivered by said entry conveyor;

a labeling station located on said slide plate;

a pusher for pushing bottles along said slide plate into said labeling station;

a slowing conveyor located downstream from said work station, said pusher being operable to drive a bottle from said entry conveyor into said labeling station and push a preceding bottle from the station;

said slowing conveyor being adapted to slow such preceding bottle exiting the labeling station while concurrently operating to continue to transport such preceding bottle substantially at the speed of the slowing conveyor whereby such driven bottle abuts and is stabilized by such slowed preceding bottle while the slowed bottle is transported away from said labeling station without slippage relative to said slowing conveyor;

said slowing conveyor being located a predetermined distance downstream of said labeling station such that each such driven bottle is properly registered at said labeling station when stabilized by one such preceding and slowed bottle; and, label applicating means for successively applying labels to successively registered bottles each while a different one of such preceding bottles is concurrently transported downstream by the slowing conveyor.

3. The labeling machine of claim 2, wherein said slowing conveyor comprises a pair of opposed belt conveyors which are spaced apart a predetermined distance to permit each product to be engaged on opposite sides.

4. The labeling machine of claim 2, wherein said slowing conveyor comprises a vertical stationary element and a spaced apart opposed conveyor, said stationary element and opposed conveyor being spaced apart a predetermined distance to permit each preceding bottle to be engaged on opposite sides.

5. A bottle registration system according to claim 2 wherein said slide plate includes a vacuum port for stabilizing bottles stopped at said work station.

* * * * *